United States Patent [19]
Salisbury et al.

[11] Patent Number: 5,676,763
[45] Date of Patent: Oct. 14, 1997

[54] PROCESS FOR CLEANING PIPE DOPE AND OTHER SOLIDS FROM WELL SYSTEMS

[75] Inventors: Darrell P. Salisbury, Sugar Land; Robert L. Sloan, Katy, both of Tex.

[73] Assignee: Well-Flow Technologies, Inc., Houston, Tex.

[21] Appl. No.: 472,415

[22] Filed: Jun. 7, 1995

[51] Int. Cl.$^6$ .......................................................... B08B 3/08
[52] U.S. Cl. ........................ 134/22.12; 134/22.14; 134/40; 166/312; 507/263
[58] Field of Search ........................... 134/22.12, 22.13, 134/22.14, 26, 28, 36, 40; 166/312; 507/263, 265, 137, 138

[56] References Cited

U.S. PATENT DOCUMENTS

| | | | |
|---|---|---|---|
| 3,954,629 | 5/1976 | Scheffel et al. | 507/117 |
| 4,005,753 | 2/1977 | Scheffel et al. | 166/283 |
| 4,192,753 | 3/1980 | Pye et al. | 507/103 |
| 4,409,108 | 10/1983 | Carney et al. | 507/138 |
| 4,593,764 | 6/1986 | Lilienthal | 166/312 |
| 4,614,236 | 9/1986 | Watkins et al. | 166/304 |
| 4,738,789 | 4/1988 | Jones | 166/307 X |
| 4,775,489 | 10/1988 | Watkins et al. | 507/202 |
| 4,925,497 | 5/1990 | Thierheimer, Jr. | 134/40 |
| 4,934,457 | 6/1990 | Wallender | 166/312 X |
| 5,031,648 | 7/1991 | Lutener et al. | 134/32 |
| 5,099,924 | 3/1992 | Gidley | 166/312 X |
| 5,484,488 | 1/1996 | Hart et al. | 134/22.14 X |
| 5,489,394 | 2/1996 | Ford et al. | 252/162 |

FOREIGN PATENT DOCUMENTS

WO95/12741  5/1995  WIPO.

OTHER PUBLICATIONS

Search Report Under Section 17, The Patent Office, United Kingdom, Aug. 12, 1996.

*Primary Examiner*—Jill Warden
*Assistant Examiner*—Saeed Chaudhry
*Attorney, Agent, or Firm*—Fish & Richardson, P.C.

[57] ABSTRACT

An improved chemical composition and process for cleaning pipe dope from wellbores has been established. The chemical composition is of an aliphatic hydrocarbon and/or esters with a biodegradable water insoluble monoterpene preferably having a flash point (PMCC) greater than 140° F. the mixture then used neat, or in a dispersion of seawater, being used to remove pipe dope from tubing, casing and the like.

9 Claims, 1 Drawing Sheet d-LIMONENE alpha-PINENE alpha-PINENE DERIVATIVES d-LIMONENE alpha-PINENE alpha-PINENE DERIVATIVES

PROCESS FOR CLEANING PIPE DOPE AND OTHER SOLIDS FROM WELL SYSTEMS

BACKGROUND AND SUMMARY OF THE INVENTION

This invention relates to the treatment of wellbore casing, tubing, drillstring, etc. to remove pipe dope. Pipe dope is a pipe thread sealant. The primary function of thread compounds is to provide sealability, galling resistance, and uniform frictional characteristics while lubricating the thread pattern of drill pipe during make up.

The current API MODIFIED pipe dope was introduced in 1955. The API MODIFIED contains lead, zinc, graphite and copper. Other metals such as aluminum flake, brass, bronze, nickel, talc, silica, calcium carbonate and clays have been used in other compounds. The heavy metals, up to 25 percent of the volume provide the sealability with their particle size being in the range of 45 microns.

The API 8 round connections are tapered with the primary sealing mechanism being achieved by making up the threads until plastic deformation of the threads occurs. The thread compound must create a film strong enough to maintain a barrier and seal between the two contacting surfaces. If the integrity of the thread compound film was broken down, the bearing stresses and heat created at the point of contact would cause the connection to weld together. The joint would eventually break down due to the tearing of the weld during additional rotation.

Unfortunately these thread compounds will effectively seal off pore throats in the formation, gravel pack or even whole perforations. By design, these compounds are resistant to temperature and chemical degradation and are difficult to remove from tubing, and nearly impossible to remove from the confines of a pore throat.

The extent of the problem can be illustrated by a typical scenario involving the completion of a 10,000 foot well with 2⅞-inch, 6.4 pound tubing. The tubing string would have 322 connections, assuming 31 foot joint length. If an average of two teaspoons of dope per connection were extruded into the string, approximately one quart of dope would end up in the tubing. Considering that the dope is water insoluble and if it were to collect in the bottom of the work string, a total of four feet of tubing could be filled. In addition most completions require several pipe trips involving the re-doping of many of the connections.

A common misconception is that pipe dope is removed or is soluble in acid or caustic when a pickle job is conducted. Acid or caustic however has almost no effect on the pipe dope.

In the past the pipe dope has been removed by using various solvents such as xylene, toluene and even low flash point terpenes. Because of increasing safety and environmental concerns these chemicals are unattractive.

A new composition for cleaning pipe dope from a well system has been developed. The composition includes a terpene hydrocarbon with a flash point of greater than 140° F. mixed with either an oil soluble aliphatic hydrocarbon, an ester with a flash point of greater than 140° F., or mixtures of both oil soluble aliphatic hydrocarbons and esters. The oil soluble aliphatic hydrocarbon component may be a mixture of different oil soluble aliphatic hydrocarbons and, likewise, the ester component may be a mixture of esters. The preferred terpenes are biodegradable monoterperens more preferably alpha-pinene derivatives. The preferred oil soluble aliphatic hydrocarbons have a viscosity of less than 10 cps @ 75° F. Preferred esters are acetic acid esters of $C_6$-$C_8$ branched alcohols. The preferred oil soluble aliphatic hydrocarbons are petroleum napthas. In the preferred mixture the terpene hydrocarbon is from about 90% to about 50% by weight of the composition and the oil soluble aliphatic hydrocarbon, ester, or mixture of both is about 10% to about 50% by weight of the composition.

A process has been developed to use the composition mixed with a brine solution such as seawater to remove the pipe dope. Although the composition can be pumped in the well without dilution, it has been found that a dilute solution offers excellent cleaning capability with about 5 to 20 minutes of contact with the area to cleaned with 10 minutes of contact time preferred. The same pump that is used on a rig to pump the cement can be utilized to pump a combination brine and pipe dope cleaning composition. Since the same pumping system is used and the contact time for a dilute solution is only 10 minutes, a significant savings in rig time utilization is achieved.

DETAILED DESCRIPTION OF THE INVENTION

Figure 1:
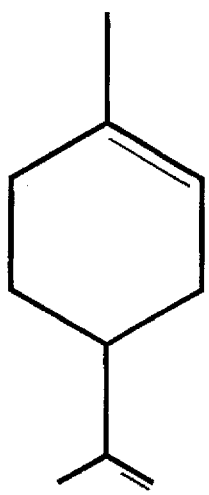
FIG. 1 shows the chemical structures of d-Limonene, alpha-pinene and some derivatives of alpha-pinene in IUPAC format.
Figure 1:
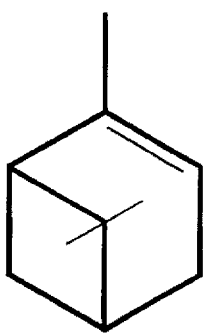
Figure 1:
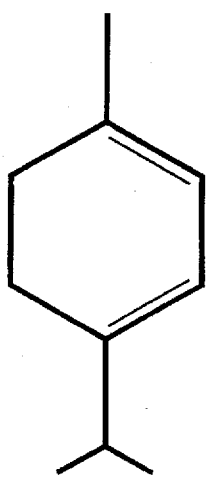
Figure 1:
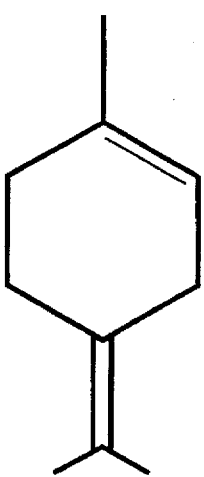
Figure 1:
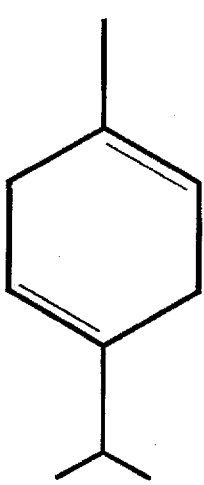

The composition is a blend of high flash point (greater than 140° F.) terpene hydrocarbon with oil soluble aliphatic hydrocarbons or esters with a flash point greater than 140° F. used in the removal of pipe dope. The composition can be pumped neat or in conjunction with seawater. The material is not soluble in seawater but when pumped in turbulent flow the solvent is broken into small droplets. The small droplets are more effective in removing the pipe dope and as a result higher pump rates can be used. The higher pump rate reduces rig operation time by several hours.

Pickling of the string can be conducted in several ways. A pump rate of 1 bbl/min has long been established in the industry. The purpose of the pipe dope pickling is to remove the dope. A subsequent treatment (acid pickling) is performed following or in conjunction with the pipe dope pickling to remove scale, rust or other contaminants by use of 5 to 15% HCl. The solvent removes the dope that may be covering the scale to improve the efficiency of the acid treatment.

A typical treatment is as follows. Pump a pill consisting of 4 drums (5 barrels) of the pipe dope cleaning composition down the tubing at 1 bbl/min. The preferred composition is about 70% alpha-pinene derivatives, Glidsol 180 manufactured by Glidco and 30% of the preferred aliphatic hydrocarbon, petroleum naptha. When the pill reaches the bottom of the tubing, but before turning the corner, reverse the flow and pump the material out of the string or tubing. This provides a total contact time of 10 minutes. The pump sequence can have a pill of acid, normally 5 to 15% HCl following directly behind the solvent. The HCl is in an aqueous solution of water, seawater, filtered brine or other available aqueous solutions.

If the tubing had a volume of 180 bbls, 6 hours would be required to pickle the string. If one pumps at 2 bbl/min (50% dilution of pipe dope cleaning composition in seawater) the time would be cut in half. For a Gulf of Mexico operation at $24,000.00/day current rig cost, the savings would be $3,000.00 and in a North Sea operation with a daily current rig rate of $60,000.00/day the savings would be $7,500.00.

EXAMPLE 1

Pipe dope is difficult to remove from steel. A test is conducted to see how quickly API MODIFIED COMPLEX pipe dope can be removed from steel. A 400 ml beaker is filled with roughly 250 ml of the fluid to be evaluated. A magnetic stir bar is used to put the fluid in turbulent flow. A steel coupon with approximately 1 inch by 2 inch area covered with about 3/32 inch layer of pipe dope is lowered into the fluid and the cleaning efficiency is measured with respect to time. The solvent tested shows a flash point measured by the Pensky Martin Closed Cup method (PMCC) in the following Table 1 and as noted in other tables herein.

TABLE 1

| SOLVENT/ Flash point (PMCC, °F.) | OIL AND WATER SOLUBLE | PERCENT CLEANING EFFICIENCY @ | | |
|---|---|---|---|---|
| | | 5 min. | 10 min. | 15 min. |
| Product A | Y/N | 57 | 90 | 97 |
| Terpene Hydrocarbon Glidsol 180/142 | Y/N | 86 | 97 | 100 |
| d-Limonene A/120 | Y/N | 77 | 93 | 100 |
| d-Limonene B/122 | Y/N | 93 | 100 | |
| 2-ethyl hexyl acetate/160 | Y/N | 71 | 85 | 97 |
| Seawater | N/Y | 0 | 0 | 0 |
| 5% HCl in seawater | N/Y | 0 | 0 | 0 |

The results summarized in Table 1 show the following. The high flash terpene hydrocarbon exceeds the performance of an existing high flash point material Product A which is a blend of d-Limonene and high flash point paraffin oil which suppresses the flash point but lowers the solvent action. The high flash point terpene is comparable to two low flash point d-Limonene materials. Seawater and HCl are ineffective in removing pipe dope.

Glidsol 180 is produced by Glidco and is a product of alpha-pinene derivatives. D-Limonene as shown in FIG. 1 is from citrus oil and has been used as a cleaner for various oil field applications. The structure of d-Limonene is known as the terpene hydrocarbon dipentene. Also shown in FIG. 1 is alpha-pinene which can be obtained from the sulfate liquor by product of the Kraft paper process. The alpha-pinene can be chemically modified to form the alpha-pinene derivative structures also shown in FIG. 1 that are similar to d-Limonene. The alpha-pinene derivatives shown on FIG. 1 are exemplary and many other structures are known to those skilled in the art. These structures have similar cleaning abilities, but have been discovered to have distinct advantages in drilling applications in pipe dope removal and wellbore clean up. The flash point of these derivatives is greater than 140° F. making them safe to transport and handle. The flash point of dipentene (d-Limonene) is below 140° F. The use of the alpha-pinene derivatives in combination the oil soluble aliphatic hydrocarbons and esters of the present invention has produced unusual results in cleaning pipe dope.

EXAMPLE 2

The following Table 2 is a sampling of various types of solvents and the ability to clean pipe dope using the methodology of Example 1.

TABLE 2

| Solvent | Class | Flash Point °F. (PMCC) | Oil Solubility | H$_2$O Solubility | Percent Cleaning Efficiency | | |
|---|---|---|---|---|---|---|---|
| | | | | | 5 min | 10 min | 15 min |
| EXXSOL D-110 | AHC | 221 | Y | N | 37 | 68 | 91 |
| SHELLSOL 142 HT | AHC | 142 | Y | N | 77 | 97 | 100 |
| ISOPAR M | PAHC | 177 | Y | N | 12 | 30 | 46 |
| EXXATE 700 | E | 151 | Y | N | 78 | 97 | 100 |
| PINE ESTER | TE | 200 | Y | N | 26 | 55 | 77 |
| EASTMAN DB | GE | 212 | Y | Y | 28 | 44 | 72 |
| DOW DPMA | GE | 186 | Y | N$_{SM}$ | 6 | 9 | 15 |
| DOW EB | GE | 150 | Y | Y | 3 | 6 | 11 |

AHC - Aliphatic Hydrocarbon
PAHC - Paraffinc Aliphatic Hydrocarbon
E - Esters
TE - Terpene Ester
GE - Gylcol Ether
EXXSOL D-110 - Petroleum Naptha, Exxon Chemical
SHELLSOL 142 HT - Petroleum Naptha, Shell Oil
ISOPAR M - Isoparaffinic Hydrocarbon, Exxon Chemical
EXXATE 700 - Acetic Acid Ester of C$_6$-C$_8$ branched alcohols also known as Oxo-heptyl alcohol, Exxon Chemical
EASTMAN DB - Diethylene Glycol Monobutyl ether, Eastman Chemical
DOW DPMA - Dipropyl Gylcol Monomethyl Ether Acetate, Dow Chemical
DOW EB - Ethylene Gycol N-Butyl Ether, Dow Chemical

EXAMPLE 3

A test on blends of an aliphatic hydrotreated hydrocarbon in removing API MODIFIED COMPLEX. The test procedure was the same as that in Example 1. The terpene hydrocarbon was Glidsol 180.

TABLE 3

| SOLVENT/ (X/Y + RATIO BY WEIGHT) | PERCENT CLEANING EFFICIENCY @ | | |
|---|---|---|---|
| | 5 min. | 10 min. | 15 min. |
| SHELLSOL 142 HT | 77 | 97 | 100 |
| Terpene Hydrocarbon (TH) | 86 | 97 | 100 |
| TH/AH 90/10 | 80 | 93 | 100 |
| TH/AH 80/20 | 88 | 100 | |
| TH/AH 70/30 | 91 | 100 | |
| TH/AH 60/40 | 77 | 97 | 100 |
| TH/AH 50/50 | 70 | 95 | 100 |

These data show that maximum efficiency was achieved at a ratio between 80/20 and 60/40 terpene/aliphatic hydrocarbon. In commercial operations a preferred blend is 70/30 terpene/aliphatic hydrocarbon.

EXAMPLE 4

A test was conducted on a 70/30% by weight, TH/AH blend mixed with seawater in removing API MODIFIED COMPLEX pipe dope at 75° F. The rest of the test procedure was the same as that in Example 1.

TABLE 4

| SOLVENT | PERCENT CLEANING EFFICIENCY @ | | | |
|---|---|---|---|---|
| | 2.5 min. | 5 min. | 10 min. | 15 min. |
| 20% in seawater | 48 | 87 | 97 | 100 |
| 40% in seawater | 67 | 90 | 100 | |
| 60% in seawater | 70 | 94 | 100 | |
| 80% in seawater | 72 | 97 | 100 | |
| 100% TH/AH | 84 | 90 | *100 | |

EXAMPLE 5

A test was conducted on a 70%/30% by weight TH/AH blend mixed with seawater in removing API MODIFIED COMPLEX pipe dope at 110° F. The rest of test procedure was the same as that in Example 1.

TABLE 5

| SOLVENT | PERCENT CLEANING EFFICIENCY @ | | | |
|---|---|---|---|---|
| | 1 min. | 2.5 min. | 5 min. | 10 min. |
| 20% in seawater | 38 | 75 | 100 | |
| 40% in seawater | 47 | 88 | 100 | |
| 60% in seawater | 61 | 91 | 100 | |
| 80% in seawater | 58 | 94 | 100 | |
| 100% TH/AH | 47 | 81 | 100 | |

The data in Examples 4 and 5 show the improved cleaning of the seawater blends over the neat solvent procedure. The drop of in performance between 60 and 100% solvent indicates the improved performance of droplets in turbulent flow.

EXAMPLE 6

A test was conducted to determine the effectiveness of Exxon D-110 a petroleum naptha aliphatic hydrocarbon with the preferred terpene, Glidsol 180. The test procedure was the same as Example 1.

TABLE 6

| SOLVENT | PERCENT CLEANING | | |
|---|---|---|---|
| | 5 min. | 10 min. | 15 min. |
| Glidsol 180 (TH) | 86 | 97 | 100 |
| EXXON D-110 (AH) | 38 | 69 | 91 |
| TH/AH by weight % | | | |
| 90/10 | 93 | 100 | |
| 80/20 | 94 | 100 | |
| 70/30 | 87 | 97 | 100 |

EXAMPLE 7

A test was conducted on an ester and the preferred terpene hydrocarbon Glidsol 180. The test procedure was the same as Example 1. The ester is Exxate 700 which is an acetic acid ester of $C_6$–$C_8$ branched alcohols.

TABLE 7

| SOLVENT | PERCENT CLEANING | | |
|---|---|---|---|
| | 5 min. | 10 min. | 15 min. |
| Glidsol 180 (TH) | 86 | 97 | 100 |
| EXXATE 700 (E) | 78 | 97 | 100 |
| TH/E by weight % | | | |
| 90/10 | 94 | 100 | |
| 80/20 | 93 | 100 | |
| 70/30 | 91 | 100 | |

The results with the ester are slightly better than the SHELLSOL HT, however the cost of the ester is significantly more. Also, 2-ethylhexylacetate can be used.

It is apparent that there has been described herein a chemical composition and process for effectively removing pipe dope from a well drilling system. Various changes and alterations may be made in the practice of the chemical composition and process by those skilled in the art without departing from the spirit of this invention. It is intended that such changes be included within the scope of the appended claims. The present description is intended to be illustrative and not limit the present invention.

What is claimed is:

1. A process for cleaning pipe dope from a well system comprising the steps of
   (a) preparing a pipe dope cleaning composition of from about 90% to about 10% by weight terpene hydrocarbon with a flash point greater than 140° F. and about 10% to about 50% by weight a component selected from the group consisting of oil soluble aliphatic hydrocarbons with a flash point of greater than 140° F., esters with a flash point of greater than 140° F. and mixtures thereof;
   (b) pumping the composition with water into a wellbore;
   (c) contacting the area in the wellbore with the pipe dope with the composition; and
   (d) removing the composition and pipe dope from the wellbore.

2. The process for cleaning pipe dope from a well system of claim 1 additionally comprising the step of pumping an acid solution into said wellbore after the pipe dope cleaning composition.

3. The process for cleaning pipe dope from a well system of claim 1 wherein the pipe dope cleaning composition is diluted at least 80% of full strength with seawater.

4. A process for cleaning pipe dope from a well system of claim 1 wherein the oil soluble aliphatic hydrocarbon has a viscosity of less than 10 cps @ 75° F.

5. A process for cleaning pipe dope from a well system of claim 1 wherein the terpene hydrocarbon is a biodegradable water insoluble monoterpene.

6. A process for cleaning pipe dope from a well system of claim 1 wherein the terpene hydrocarbon is selected from the group of alpha-pinene derivatives and mixtures thereof.

7. A process for cleaning pipe dope from a well system of claim 1 wherein the aliphatic hydrocarbon is petroleum naptha.

8. A process for cleaning pipe dope from a well system of claim 1 wherein the aliphatic hydrocarbon has a flash point of less than 200° F.

9. A process for cleaning pipe dope of claim 1 wherein the ester is an acetic acid ester of $C_6$–$C_8$ branched alcohol.

* * * * *